Nov. 28, 1950  S. I. MacDUFF  2,531,695
FLUID MOTOR MECHANISM
Filed Jan. 31, 1947  2 Sheets-Sheet 1
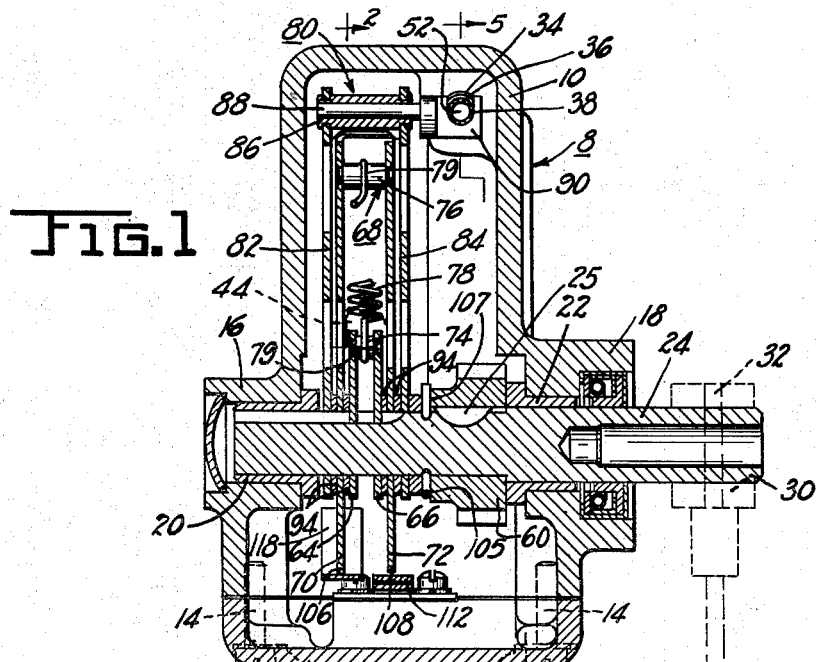
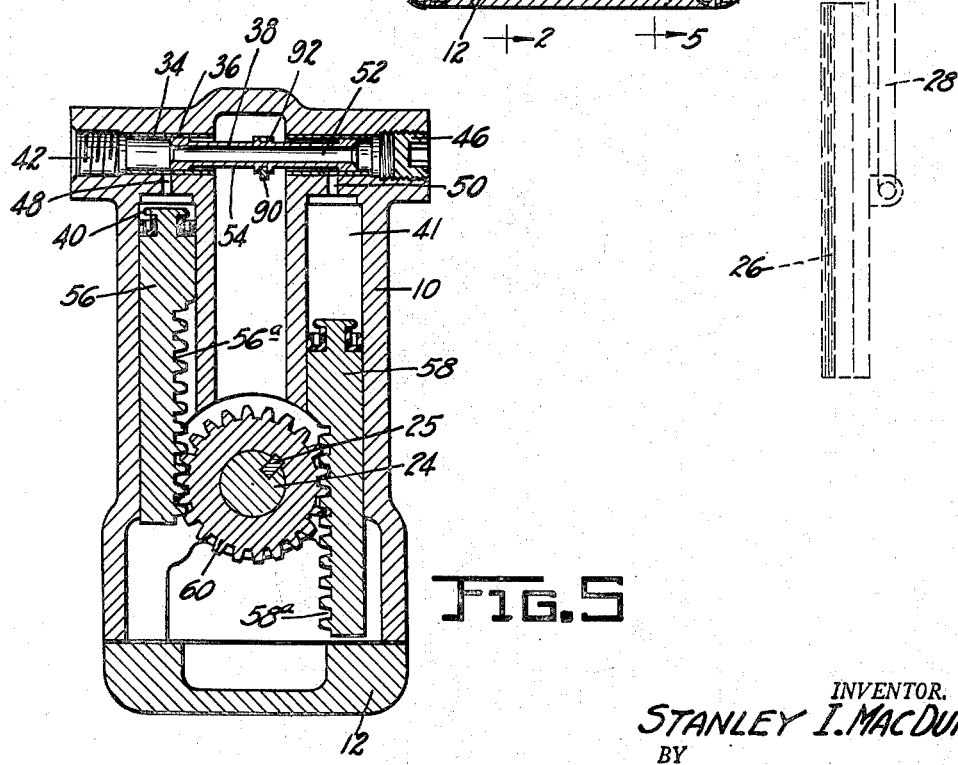
INVENTOR.
STANLEY I. MACDUFF
BY Cecil F. Arens
ATTORNEY

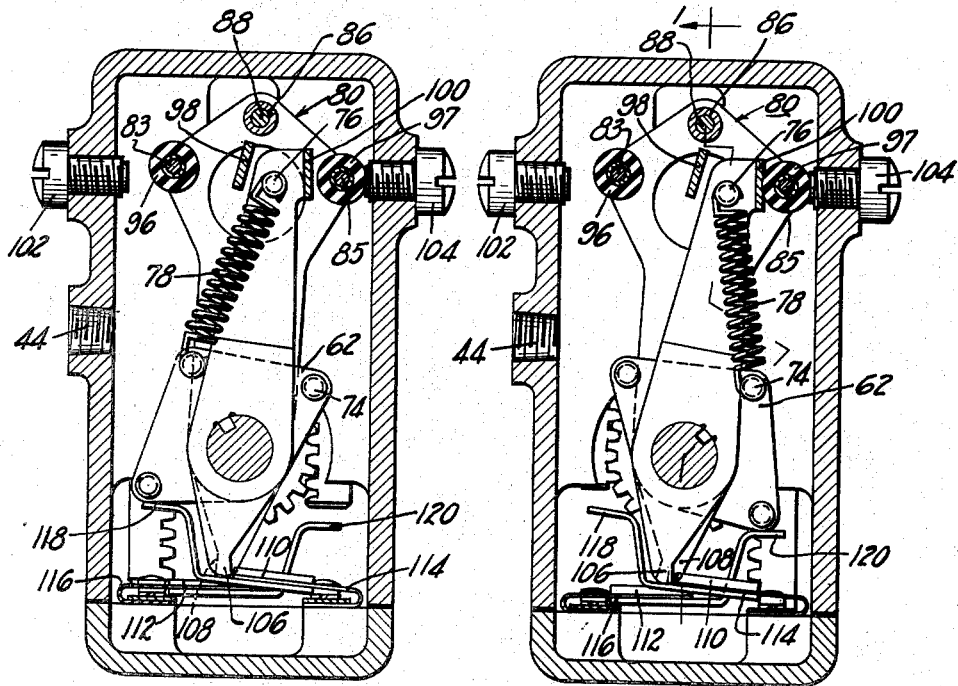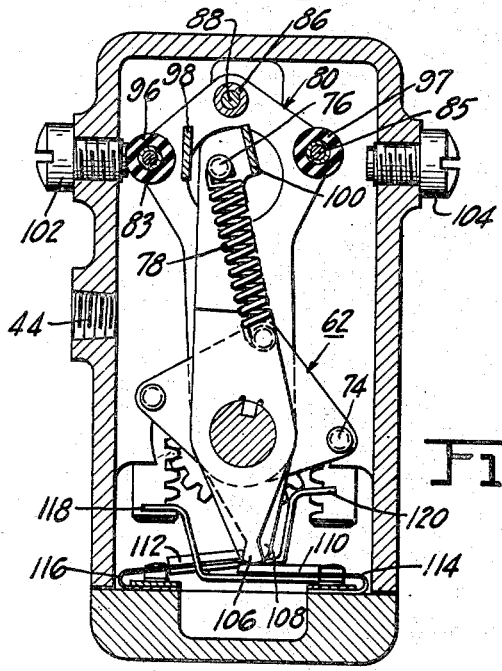

Patented Nov. 28, 1950

2,531,695

UNITED STATES PATENT OFFICE 2,531,695

FLUID MOTOR MECHANISM

Stanley I. MacDuff, South Bend, Ind., assignor to Bendix Aviation Corporation, South Bend, Ind., a corporation of Delaware Application January 31, 1947, Serial No. 728,334

10 Claims. (Cl. 121—165)

This invention relates to fluid operated motors and more particularly to fluid motors for windshield cleaners.

It is an object of the invention to provide a fluid actuated motor simple in construction and compact in form.

It is a more important object of the invention to provide a fluid actuated windshield cleaner motor which will have a substantially constant speed of operation irrespective of the engine speed of a motor vehicle with which it is used.

A further important object of the invention resides in the provision of a novel valve control mechanism for a fluid actuated motor.

The above and other objects and features of the invention will be apparent from the description of the device illustrated in the accompanying drawings, in which:

Figure 1 is a longitudinal sectional view of the device of the invention taken on the line 1—1 of Figure 2;

Figures 2, 3 and 4 are transverse sections of the invention taken on the line 2—2 of Figure 1 showing the valve control mechanism in different positions of operation; and Figure 5 is a transverse section of the device of the invention taken on the line 5—5 of Figure 1.

Referring to Figure 1 of the drawings the reference numeral 8 designates a fluid actuated motor having a housing 10 equipped with a cover 12 suitably secured thereto by screws 14. The housing is provided with hub portions 16 and 18 formed to receive bearings 20 and 22 respectively in which a shaft 24 is positioned for rotation. For the purpose of exemplification the motor is shown in association with a windshield cleaner 26 carried by an arm 28 integral with a hub 30 which is secured to the shaft 24 in any suitable manner as by pin 32. The housing is bored at 34 at right angles to the shaft 24 to receive sleeves 36 in which a valve 38 is arranged to slide to thereby control the flow of fluid between cylinders 40 and 41, and inlet and exhaust ports 42 and 44 respectively. The exhaust port 44 is in direct communication with the interior of the housing. The end of the bore 34 opposite the inlet port is closed by a plug 46. The ends of the cylinders 40 and 41 are in communication with the bore 34 through passages 48 and 50 respectively. The valve 38 is longitudinally bored at 52 to provide communication between the end of cylinder 41 and the inlet port 42 when the valve is shifted to the left as viewed in Figure 5, at which time passage 48 is cut off from the inlet port and passage 50 is uncovered by the valve. However, with the valve in a position to the right as shown in Figure 5 the inlet port is in communication with the end of cylinder 40 through passage 48 and the exhaust or outlet port 44 is in communication with the end of cylinder 41 through passage 50. The valve 38 has a reduced diameter 54 to permit the passage of fluid between the sleeves and the valve as the fluid flows from the cylinders to the outlet port during the exhausting operation. The cylinders 40 and 41 are disposed in parallel relationship on opposite sides of the shaft 24 and lie in a plane perpendicular thereto. Pistons 56 and 58 having racks 56a and 58a integral therewith are reciprocally positioned in the cylinders. The racks 56a and 58a are arranged in meshing relationship with a gear 60 secured to shaft 24 by a key 25 to thereby impart rotation to said shaft when the motor is actuated.

For periodically reversing the direction of rotation of shaft 24 a valve actuating mechanism is located within the housing 10. It is a purpose of this mechanism to shift or slide valve 38 at the proper time to alternately connect the respective cylinders to the inlet and outlet ports. A cam 62 is splined to shaft 24 to rotate therewith. As best shown in Figure 1 the cam 62 is made of two parallel spaced apart stampings 64 and 66. A latching lever member 68 is pivoted on shaft 24 and is rotatable relative to cam 62 about the shaft as a pivot. The latch lever 68 includes a pair of parallel stampings 70 and 72 spaced apart along the shaft so that they are disposed on either side of the cam 62. The stampings 64 and 66 and 70 and 72 are tied together by rivets 74 and 76 respectively. A coiled spring 78 is provided with hook ends which are hooked over the rivets 74 and 76 to provide a flexible connection between the cam and the latch lever so as to impart rotation to the latter when the former is rotated by shaft 24. Grooves 79 are provided in the rivets 74 and 76 to keep the spring centered.

A valve operating lever 80 is also pivotally mounted on the shaft 24 to rotate relative to the cam and to the latch lever. The valve lever 80 comprises two parallel stampings 82 and 84 spaced apart along the shaft so that they are positioned on either side of the latch lever 68. The stampings 82 and 84 are tied together by rivets 83, 85 and 86. Rivet 86 is a sleeve rivet constituted to receive a pin 88 having an end 90 formed as a yoke to engage a grooved collar 92 integral with the valve 38. Spacers 94 are interposed between the stampings 64, 66, 70, 72, and 84. Cylindrical rubber bushings 96 and 97 encase the rivets 83 and 85 to provide bumpers for the valve lever at each end of its cycle of oscillation. The upper end of latch lever 68 is formed with lateral faces 98 and 100 integral with stampings 70 and 72 respectively. The rubber bumpers 96 and 97 are rotated against screws 102 and 104 by the latch lever 68, to which rotation is imparted by the over-center spring 78. These screws are mounted in the housing 10 to furnish accurate stop means for regulating the amount of rotation of the valve lever and consequently the valve movement.

The motor is adapted to be assembled by pushing the shaft 24 through the bearing 18, the gear 60, the several levers and their respective spacers 94. The shaft is stepped and the bearing 22 is made larger to permit the key 26 to pass therethrough and enter the keyway in the gear 60. When the shaft has been inserted in this manner it is secured against withdrawal by insertion of a "hairpin" fastener 105 into an annular groove 107 formed in the shaft 24 just to the left of the gear 60.

In order to defer shifting or sliding the valve after the coiled spring 78 has passed across center so as to obtain maximum desired rotation of the shaft in a preselected direction the latch lever 68 has its lower end equipped with fingers 106 and 108 integrally related to stampings 70 and 72 respectively, which fingers are arranged to engage latches 110 and 112 at the proper time in the cycle to normally latch the latch lever in one or the other of its positions. The latches are carried at the free ends of flat springs 114 and 116 securely fastened at the other ends to the cover 12. Offset elements 118 and 120 are attached to the free ends of the springs and constituted to extend into the path of the cam. The arrangement is such that one of the elements is engaged by the cam as it rotates in one direction and the other element is engaged during rotation of the cam in the opposite direction. This controls the latching and releasing of the latch lever as will be hereinafter described.

Operation of the device of the invention is as follows: With the valve in the position shown in Figure 5 and the valve actuating mechanism parts positioned as shown in Figure 2, assume fluid under pressure is admitted at the inlet port 42. Since the end of cylinder 40 is in communication with the inlet port through passage 48 the fluid pressure acting on the end of piston 56 will move it downwardly rotating shaft 24 counterclockwise as viewed in Figure 5. At the same time piston 58 will move upwardly exhausting fluid to the outlet port through passage 50 and the interior of the housing.

At this time it will be well to point out that with piston 56 in a position at the top of the cylinder as shown in Figure 5, the valve actuating mechanism parts will be located as shown in Figure 2, so that cam 62 will have urged the latch means 112 out of engagement with finger 108 to have allowed the spring 78 to have rotated the latch lever to thereby have caused the lateral face 100 to have bumped against the rubber bumper 97 of the valve lever 80. It should also be noted that at this time finger 106 of cam 62 is in latching relationship with the latch means 110.

As piston 56 moves downwardly and rotates shaft 24 counterclockwise cam 62 is likewise rotated (see Figure 3) until it contacts element 118 of the latch means to cam the element downwardly to disengage latch 110 from the finger 106, at which time spring 78 can rotate the latch lever against the rubber bumper 96 to slide or shift the valve to the left of Figure 5. Figure 3, shows the position of the cam and latch means just before the cam has completed its counterclockwise rotation to cause the finger 106 to be disengaged from latch 110.

Figure 4 shows the position of the cam subsequent to the disengaging movement between latch 110 and finger 106 and shortly after the valve has been shifted and the shaft has been caused to reverse its direction of rotation. Finger 108 is now in latching relationship with respect to latch 112 to defer shifting the valve to the right until the proper time of the cycle.

With the valve shifted to the left fluid under pressure from the inlet is now forced into the end of cylinder 41 through passages 50 and 52 to drive piston 58 downwardly and piston 56 upwardly to exhaust fluid to the outlet port through passage 48 and the interior of the housing. This action of the piston 58 rotates the shaft and also the cam 62 clockwise as shown in Figure 4 to reverse the cycle of operation.

Although this invention has been described in connection with certain specific embodiments, the principles are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is.

I claim:

1. A fluid motor mechanism comprising a rotatable shaft, a pair of pistons drivably connected to the shaft and disposed one on each side thereof and normal thereto, inlet and exhaust ports, passages for subjecting an end of one of the pistons to inlet port pressure and simultaneously subjecting an end of the other piston to exhaust port pressure to thereby cause rotation of the shaft in one direction, passages for subjecting said end of said one piston to exhaust port pressure and said end of said other piston to inlet port pressure to thereby cause rotation of the shaft in the opposite direction, a valve constituted to control the flow of fluid in the passages, a valve actuating mechanism responsive to shaft rotation for shifting the valve to periodically reverse direction of rotation of the shaft, said valve actuating mechanism including a cam rotatable with the shaft, a latch lever operatively connected to said valve and rotatable relative to the cam about an axis common with the axis of the shaft, a coiled spring interconnecting the cam and the latch lever to rotate the same, and latch means normally engaging the latch lever against rotation and actuable by the cam at a predetermined time to disengage said latch lever whereby the coiled spring imparts rotation thereto to cause the valve to shift.

2. A mechanism adapted to be connected to a windshield wiper comprising a fluid motor, a shaft rotatably connected to the motor, means for controlling the supply of fluid to said motor including a valve constructed and arranged to have one position in which fluid can enter and exhaust from said motor in a manner to thereby obtain one direction of rotation of said shaft, said valve shiftable axially to a second position in which fluid can enter and exhaust from said motor in a manner to thereby rotate the shaft in the opposite direction, a valve actuating mechanism comprising a cam fixed to the shaft, a latch lever carried by the shaft and rotatable relative to the cam, a valve operating lever carried by the shaft and rotatable relative to said latch lever, said valve operating lever operatively connected to said valve and constituted to be engaged by said latch lever to receive a driving force therefrom, a resilient connection between the cam and said latch lever for imparting rotation thereto, and latch means normally engaging said latch lever against rotation, said latch means operable periodically by said cam in response to predetermined shaft rotation to disengage said latch lever.

3. A mechanism adapted to be connected to a windshield wiper comprising a fluid motor, a shaft rotatably connected to the motor, means for controlling the supply of fluid to said motor including a valve constructed and arranged to have one position in which fluid can enter and exhaust from said motor in a manner to thereby obtain one direction of rotation of said shaft, said valve shiftable axially to a second position in which fluid can enter and exhaust from said motor in a manner to thereby rotate the shaft in the opposite direction, a valve actuating mechanism comprising a cam fixed to the shaft, a latch lever carried by the shaft and rotatable relative to the cam, a valve operating lever carried by the shaft and rotatable relative to said latch lever, said valve operating lever operatively connected to said valve and constituted to be engaged by said latch lever to receive a driving force therefrom, a resilient connection between the cam and said latch lever for imparting rotation thereto, latch means normally engaging said latch lever against rotation, said latch means operable periodically by said cam in response to predetermined shaft rotation to disengage said latch lever, whereby said valve is shifted periodically to reverse the direction of rotation of said shaft, and means disposed in the path of rotation of said valve operating lever for controlling the amount of rotation thereof and hence the distance the valve shifts axially.

4. A mechanism adapted to be connected to a windshield wiper comprising a fluid motor, a shaft connected to the fluid motor to be rotated thereby, means for controlling the supply of fluid to said motor including a valve constructed and arranged to have one position in which fluid can enter and exhaust from said motor in a manner to obtain one direction of rotation of said shaft, said valve shiftable to a second position in which fluid can enter and exhaust from said motor to thereby rotate said shaft in the opposite direction, a valve actuating mechanism comprising a cam drivably fastened to the shaft, a latch lever pivotally mounted on the shaft and having limited rotatable movement relative to the cam, a valve operating lever pivotally mounted on the shaft and freely rotatable relative to said cam and latch lever, said valve operating lever operatively connected to said valve and arranged in the path of rotation of said latch lever to be struck thereby to absorb energy therefrom to thereby be rotated, a coiled spring interconnecting the cam to the latch lever for imparting rotation thereto, and latch means normally engaging said latch lever against rotation in one or the other directions, said latch means operable periodically by said cam to disengage said latch lever for rotation in one direction, said latch means operable to engage said latch lever against rotation in said other direction after rotation in said one direction.

5. A mechanism contained within a single housing adapted to be connected to a windshield wiper comprising a fluid motor, a shaft in the housing connected to the fluid motor to be rotated thereby, means for controlling the supply of fluid to said motor including a valve constructed and arranged to have one position in which fluid can enter and exhaust from said motor in a manner to thereby obtain one direction of rotation of said shaft, said valve shiftable to a second position in which fluid can enter and exhaust from said motor in a manner to thereby rotate said shaft in the opposite direction, a valve actuating mechanism in the housing comprising a cam drivably secured to the shaft, a latch lever pivotally mounted on the shaft and having limited rotatable movement relative to said cam, a valve operating lever pivotally mounted on the shaft and rotatable relative to said cam and latch lever, said valve operating lever connected to said valve and arranged in the path of rotation of said latch lever to be struck thereby to receive energy therefrom to thereby be rotated, a coiled spring interconnecting the cam to the latch lever for imparting rotation thereto in either direction, a cover for the housing, and latch means mounted on the cover for normally engaging said latch lever against rotation in one or the other directions, said latch means operable periodically by said cam to disengage said latch lever for rotation in one direction, said latch means operable to engage said latch lever against rotation in said other direction after rotation in said one direction.

6. A mechanism contained within a single housing adapted to be connected to a windshield wiper comprising a fluid motor, a shaft in the housing connected to the fluid motor to be rotated thereby, means for controlling the supply of fluid to said motor including a valve constructed and arranged to have one position in which fluid can enter and exhaust from said motor in a manner to thereby obtain one direction of rotation of said shaft, said valve shiftable axially to a second position in which fluid can enter and exhaust from said motor in a manner to thereby rotate said shaft in the opposite direction, a valve actuating mechanism in the housing comprising a cam drivably secured to the shaft, a latch lever pivotally mounted on the shaft and having limited rotatable movement relative to said cam, a valve operating lever pivotally mounted on the shaft and rotatable relative to said cam and latch lever, said valve operating lever operatively connected to said valve and arranged in the path of rotation of said latch lever to be struck thereby to receive energy therefrom to thereby be rotated, a coiled spring interconnecting the cam to the latch lever for imparting rotation thereto in either direction, a cover for the housing, latch means mounted on the cover for normally engaging said latch lever against rotation in one or the other directions, said latch means operable periodically by said cam to disengage said latch lever for rotation in one direction, said latch means operable to engage said latch lever against rotation in said other direction after rotation in said one direction, and means disposed in the path of rotation of said valve operating lever for controlling the rotation thereof and hence the distance the valve shifts axially.

7. In a fluid motor mechanism, two cylinders arranged side by side in spaced relationship so that their longitudinal axis lie in the same plane, an operating shaft disposed between said cylinders and normal to the plane passing through the axis of said cylinders, valve means interconnecting corresponding ends of said cylinders and operable to control the supply and exhaust of fluid to said cylinders, and a valve actuating mechanism carried on said shaft and operatively connected to said valve means for shifting the same to periodically reverse the direction of rotation of the shaft.

8. In a fluid motor, a housing, a pair of parallel cylinders in said housing, a chamber in said housing extending between said cylinders, aligned bores in said housing extending across the top of each cylinder and forming a valve passage intersected by said chamber, a valve having one end in each of said bores and provided with operating means at its center, and a mechanism in said chamber engageable with said operating means and operable to shift the valve.

9. In a fluid motor, a housing having an opening therein, a pair of parallel cylinders and a chamber formed in the housing, and accessible through said opening, a valve passage extending across the ends of the cylinders and having a portion formed by said chamber, a port in one end of said valve passage, oppositely disposed aligned shaft bearings in the chamber, said housing being formed with a shaft opening adjacent one of said bearings, a valve, pistons, shaft operating means, valve operating mechanism, a shaft and a key device, all constructed and arranged so that the valve is insertable through said port, the pistons and shaft operating means and valve operating mechanism are insertable through said opening to operatively engage said valve and secure it against removal, the shaft is insertable through said shaft opening and bearings to operatively engage and secure against removal said pistons and piston operating means and valve operating mechanism, and said key being insertable into said shaft through said opening to secure said shaft against removal.

10. In a fluid motor, a housing having an opening therein, a pair of parallel cylinders and a chamber formed in the housing, and accessible through said opening, a valve passage extending across the ends of the cylinders and having a portion formed by said chamber, a port in one end of said valve passage, oppositely disposed aligned shaft bearings in the chamber, said housing being formed with a shaft opening adjacent one of said bearings, a valve, pistons, shaft operating means, valve operating mechanism, a shaft and a key device all constructed and arranged so that the valve is insertable through said port, the pistons and shaft operating means and valve operating mechanism are insertable through said opening to operatively engage said valve and secure it against removal, the shaft is insertable through said shaft opening and bearings to operatively engage and secure against removal said pistons and piston operating means and valve operating mechanism, said key being insertable into said shaft through said opening to secure said shaft against removal, and a cover for said opening having latch means therein operably engaging said valve operating mechanism when the cover is secured in place.

STANLEY I. MacDUFF.

REFERENCES CITED

The following references are of record in the file of this patent:

UNITED STATES PATENTS

| Number | Name | Date |
|---|---|---|
| 1,623,028 | Barett et al. | Mar. 29, 1927 |
| 1,981,840 | Hueber et al. | Nov. 20, 1934 |
| 2,204,698 | Rinot | June 18, 1940 |

FOREIGN PATENTS

| Number | Country | Date |
|---|---|---|
| 648,744 | Germany | Aug. 7, 1937 |

Certificate of Correction

Patent No. 2,531,695 November 28, 1950

STANLEY I. MacDUFF

It is hereby certified that error appears in the printed specification of the above numbered patent requiring correction as follows:

Column 6, line 6, for "winudshield" read *windshield*; column 7, lines 5 and 8, for "axis" read *axes*;

and that the said Letters Patent should be read as corrected above, so that the same may conform to the record of the case in the Patent Office.

Signed and sealed this 20th day of November, A. D. 1951.

[SEAL]

THOMAS F. MURPHY,
*Assistant Commissioner of Patents.*